US008542620B2

(12) United States Patent
Sampathkumar

(10) Patent No.: US 8,542,620 B2
(45) Date of Patent: Sep. 24, 2013

(54) DYNAMIC ENERGY SAVING MECHANISM FOR ACCESS POINTS

(75) Inventor: Badri Srinivasan Sampathkumar, Chennai (IN)

(73) Assignee: QUALCOMM Incorporated, San Diego, CA (US)

( * ) Notice: Subject to any disclaimer, the term of this patent is extended or adjusted under 35 U.S.C. 154(b) by 766 days.

(21) Appl. No.: 12/492,405

(22) Filed: Jun. 26, 2009

(65) Prior Publication Data

US 2010/0284316 A1 Nov. 11, 2010

(30) Foreign Application Priority Data

May 5, 2009 (IN) .......................... 1177/MUM/2009

(51) Int. Cl.
*G08C 17/00* (2006.01)

(52) U.S. Cl.
USPC .......................................... 370/311; 370/459

(58) Field of Classification Search
USPC .................. 370/311, 328–329, 335–336, 338, 370/341–343, 345, 432, 437, 441–442, 449–450, 370/458–459
See application file for complete search history.

(56) References Cited

U.S. PATENT DOCUMENTS

| | | | |
|---|---|---|---|
| 6,421,714 B1 | 7/2002 | Rai et al. | |
| 6,570,857 B1 * | 5/2003 | Haartsen et al. | 370/312 |
| 6,580,704 B1 | 6/2003 | Wellig et al. | |
| 6,829,493 B1 * | 12/2004 | Hunzinger | 455/574 |
| 6,836,472 B2 * | 12/2004 | O'Toole et al. | 370/335 |
| 7,260,068 B2 * | 8/2007 | Hsieh et al. | 370/311 |
| RE40,032 E | 1/2008 | van Bokhorst et al. | |
| 7,457,271 B2 * | 11/2008 | Donovan | 370/338 |
| 7,505,795 B1 * | 3/2009 | Lim et al. | 455/574 |
| 7,567,815 B2 * | 7/2009 | Nishikawa et al. | 455/502 |
| 7,577,114 B2 * | 8/2009 | Hsieh et al. | 370/311 |

(Continued)

FOREIGN PATENT DOCUMENTS

| | | |
|---|---|---|
| EP | 2157739 | 2/2010 |
| WO | 2012078379 A1 | 6/2012 |

OTHER PUBLICATIONS

"IEEE Standard for Information technology-Telecommunications and information exchange between systems-Local and metropolitan area networks-Specific requirements—Part 11: Wireless LAN Medium Access Control (MAC) and Physical Layer (PHY) Specifications", *IEEE* Std 802.11-2007 (Revision of IEEE Std 802.11-1999) http://standards.ieee.org/getieee802/download/802.11-2007.pdf. (Date Obtained from Internet Oct. 21, 2009) Jun. 12, 2007 , pp. 59-312.
Co-pending U.S. Appl. No. 12/562,819, filed Sep. 18, 2009.
Co-pending U.S. Appl. No. 12/705,267, filed Feb. 12, 2010.
Co-pending U.S. Appl. No. 12/727,610, filed Mar. 19, 2010.
Co-pending U.S. Appl. No. 12/768,434, filed Apr. 27, 2010.

(Continued)

*Primary Examiner* — Kevin Mew
(74) *Attorney, Agent, or Firm* — DeLizio Gilliam, PLLC

(57) ABSTRACT

Mobile access points typically run on batteries, and therefore, can operate for a limited amount of time without an external power source. However, because the access point service model requiring the access point to always be available and the access point's limited battery capacity reduces the time that the mobile access point can be used. Functionality can be incorporated in mobile access points to implement power saving mechanisms by altering the service model that requires the access point to always be available. Configuring the access point to enter into a low powered state for a predefined period of time can conserve mobile access point power and prolong battery life. Functionality for implementing power saving mechanisms can also be incorporated on fixed access points for efficient utilization of computing resources.

25 Claims, 8 Drawing Sheets

(56) References Cited

U.S. PATENT DOCUMENTS

| | | | |
|---|---|---|---|
| 7,804,849 B2* | 9/2010 | Mahany et al. | 370/466 |
| 7,864,720 B2* | 1/2011 | Jeyaseelan | 370/311 |
| 7,916,663 B2 | 3/2011 | Yee | |
| 7,978,638 B2* | 7/2011 | Kim et al. | 370/311 |
| 7,995,507 B2* | 8/2011 | Singh et al. | 370/311 |
| 8,014,370 B2 | 9/2011 | Banerjea et al. | |
| 8,023,522 B2* | 9/2011 | Gobriel et al. | 370/412 |
| 8,045,494 B2* | 10/2011 | Habetha et al. | 370/311 |
| 8,072,913 B2* | 12/2011 | Desai | 370/311 |
| 8,098,635 B2* | 1/2012 | Montojo et al. | 370/335 |
| 8,099,047 B2* | 1/2012 | David et al. | 455/41.2 |
| 8,112,650 B2* | 2/2012 | Qing et al. | 713/321 |
| 8,233,462 B2* | 7/2012 | Walton et al. | 370/338 |
| 2002/0045435 A1 | 4/2002 | Fantaske | |
| 2002/0164963 A1 | 11/2002 | Tehrani et al. | |
| 2005/0135284 A1 | 6/2005 | Nanda et al. | |
| 2005/0136914 A1 | 6/2005 | Van Kampen et al. | |
| 2005/0152324 A1 | 7/2005 | Benveniste | |
| 2005/0286454 A1 | 12/2005 | Morimoto et al. | |
| 2006/0029024 A1 | 2/2006 | Zeng et al. | |
| 2007/0077936 A1 | 4/2007 | Tomisawa et al. | |
| 2007/0171910 A1 | 7/2007 | Kumar | |
| 2008/0069021 A1 | 3/2008 | Chhabra | |
| 2009/0016248 A1 | 1/2009 | Li et al. | |
| 2009/0073945 A1 | 3/2009 | Seok | |
| 2009/0097438 A1 | 4/2009 | Kneckt et al. | |
| 2009/0196211 A1 | 8/2009 | Wentink | |
| 2009/0310578 A1 | 12/2009 | Convertino et al. | |
| 2010/0070767 A1 | 3/2010 | Walker et al. | |
| 2010/0118797 A1* | 5/2010 | Park et al. | 370/329 |
| 2010/0128701 A1 | 5/2010 | Nagaraja | |
| 2010/0153727 A1 | 6/2010 | Reznik et al. | |
| 2010/0189021 A1 | 7/2010 | He et al. | |
| 2010/0254290 A1 | 10/2010 | Gong et al. | |
| 2010/0325459 A1 | 12/2010 | Kangude et al. | |
| 2011/0051638 A1 | 3/2011 | Jeon et al. | |
| 2011/0086662 A1 | 4/2011 | Fong et al. | |
| 2011/0158142 A1 | 6/2011 | Gong et al. | |
| 2011/0237294 A1 | 9/2011 | Hussain | |
| 2011/0280170 A1 | 11/2011 | Bowser et al. | |
| 2012/0021735 A1 | 1/2012 | Maeder et al. | |
| 2012/0151089 A1 | 6/2012 | Ponmudi et al. | |
| 2013/0028206 A1* | 1/2013 | Cho et al. | 370/329 |

OTHER PUBLICATIONS

Co-pending U.S. Appl. No. 12/768,912, filed Apr. 28, 2010.
Co-pending U.S. Appl. No. 12/963,160, filed Dec. 8, 2010.
Co-pending U.S. Appl. No. 13/088,081, filed Apr. 15, 2011.
"IEEE Std 802.11z: IEEE Standard for Information Technology—Amendment 7: Extensions to Direct-Link Setup", IEEE Computer Society 3 Park Avenue New York, NY 10016-5997 http://ieeexplore.ieee.org/xpl/freeabs alljsp"amumber=5605400 Oct. 14, 2010, 96 pages.
IEEE, "Wireless LAN Medium Access Control (MAC) and Physical Layer (PHY) Specifications", IEEE Standard for Information Technology Section 11.0, http://standards.ieee.org/getieee802/downtoad/802.11-2007.pdf Jun. 12, 2007, pp. 419-468.
International Search Report and Written Opinion—PCT/US2011/062154—ISA/EPO—Mar. 6, 2012.
Jung Eun-Sun et al., "A Power Control MAC Protocol for Ad Hoc Networks", 2002, 12 pages.
"U.S. Appl. No. 12/562,819 Office Action", Nov. 14, 2011, 26 pages.
Co-pending U.S. Appl. No. 13/413,011, filed on Mar. 6, 2012.
"U.S. Appl. No. 12/562,819 Final Office Action", May 3, 2012, 32 pages.
"U.S. Appl. No. 12/705,267 Office Action", Mar. 22, 2012, 11 pages.
"U.S. Appl. No. 12/562,819 Office Action", Feb. 5, 2013, 29 pages.
"U.S. Appl. No. 12/727,610 Final Office Action", Jan. 7, 2013, 24 pages.
"U.S. Appl. No. 12/727,610 Office Action", Aug. 2, 2012, 20 pages.
"U.S. Appl. No. 12/768,434 Final Office Action", Mar. 20, 2013, 15 pages.
"U.S. Appl. No. 12/768,434 Office Action", Oct. 15, 2012, 11 Pages.
"U.S. Appl. No. 12/768,912 Final Office Action", Feb. 22, 2013, 27 Pages.
"U.S. Appl. No. 12/768,912 Office Action", Sep. 7, 2012, 23 pages.
"PCT Application No. PCT/US11/62154 International Preliminary Report on Patentability", Jun. 20, 2013, 8 pages.
"PCT Application No. PCT/US2013/029377 International Search Report", Jun. 17, 2013, 11 pages.
"U.S. Appl. No. 12/963,160 Office Action", Apr. 16, 2013, 25 pages.
"U.S. Appl. No. 13/088,081 Non-Final Office Action", Apr. 24, 2013, 14 Pages.

* cited by examiner

US 8,542,620 B2

DYNAMIC ENERGY SAVING MECHANISM FOR ACCESS POINTS

RELATED APPLICATION

This application claims the priority benefit of Application No. 1177/MUM/2009 filed in India on May 5, 2009.

BACKGROUND

Embodiments of the inventive subject matter generally relate to the field of wireless communication networks, and more particularly, to a dynamic energy saving mechanism for access points.

Access points enable communication devices to connect to and transmit information via a communication network. Mobile access points allow for continuous connectivity to the communication network (such as the Internet) without being restrained by the coverage area of a fixed access point. However, because mobile access points typically run on batteries, mobile access points can only operate for a limited amount of time without an external power source. Fixed access points are powered by an external power source and therefore can provide continuous access to the communication network without the limitations of using a battery. However, fixed access points can consume a significant amount of power. Energy saving mechanisms can be implemented in mobile access points to improve battery life, and in fixed access points to reduce power consumption (e.g., for green computing).

SUMMARY

Various embodiments are disclosed for reducing power consumption in an access point. In one embodiment, the access point receives, from a station, a message indicating a station sleep interval associated with the station. The station sleep interval indicates a time interval in which the station will enter a sleep mode. Access point quiet information comprising an access point sleep interval is calculated based, in part, on the station sleep interval. The access point sleep interval indicates a time interval in which the access point will enter a sleep mode. The access point quiet information is transmitted to the station to prevent the station from initiating transmissions during the access point sleep interval. A start of the access point sleep interval is determined based on the access point quiet information. The sleep mode in the access point is initiated at the start of the access point sleep interval.

BRIEF DESCRIPTION OF THE DRAWINGS

The present embodiments may be better understood, and numerous objects, features, and advantages made apparent to those skilled in the art by referencing the accompanying drawings.

DESCRIPTION OF THE EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although some examples refer to mobile phones that can operate as access points, some embodiments may include other types of mobile devices that can operate as access points, fixed access points, or access points that can be powered by either an external power source or batteries. For instance, well-known instruction instances, protocols, structures, and techniques have not been shown in detail in order not to obfuscate the description.

Traditionally, access points have been based on a service model that requires the access points to always be available to receive transmissions from one or more clients (e.g., communicating stations). Mobile access points (e.g., mobile phones behaving as access points) can provide portability and the ability to connect to a communication network (e.g., Internet) at any time without the need for access to a power source. However, the access point service model requiring the access point to always be available and the access point's limited battery capacity reduces the time that the mobile access point can be used. Power saving mechanisms can implemented on the mobile access point by altering the service model that requires the access point to always be available. In implementing the power saving mechanisms, the access point can be configured to enter into a low powered state for a pre-defined period of time based, at least in part, on sleep intervals associated with the clients connected to the access point. By operating in a low powered state during predefined intervals, the mobile access point can conserve power and prolong battery life.

Figure 1:
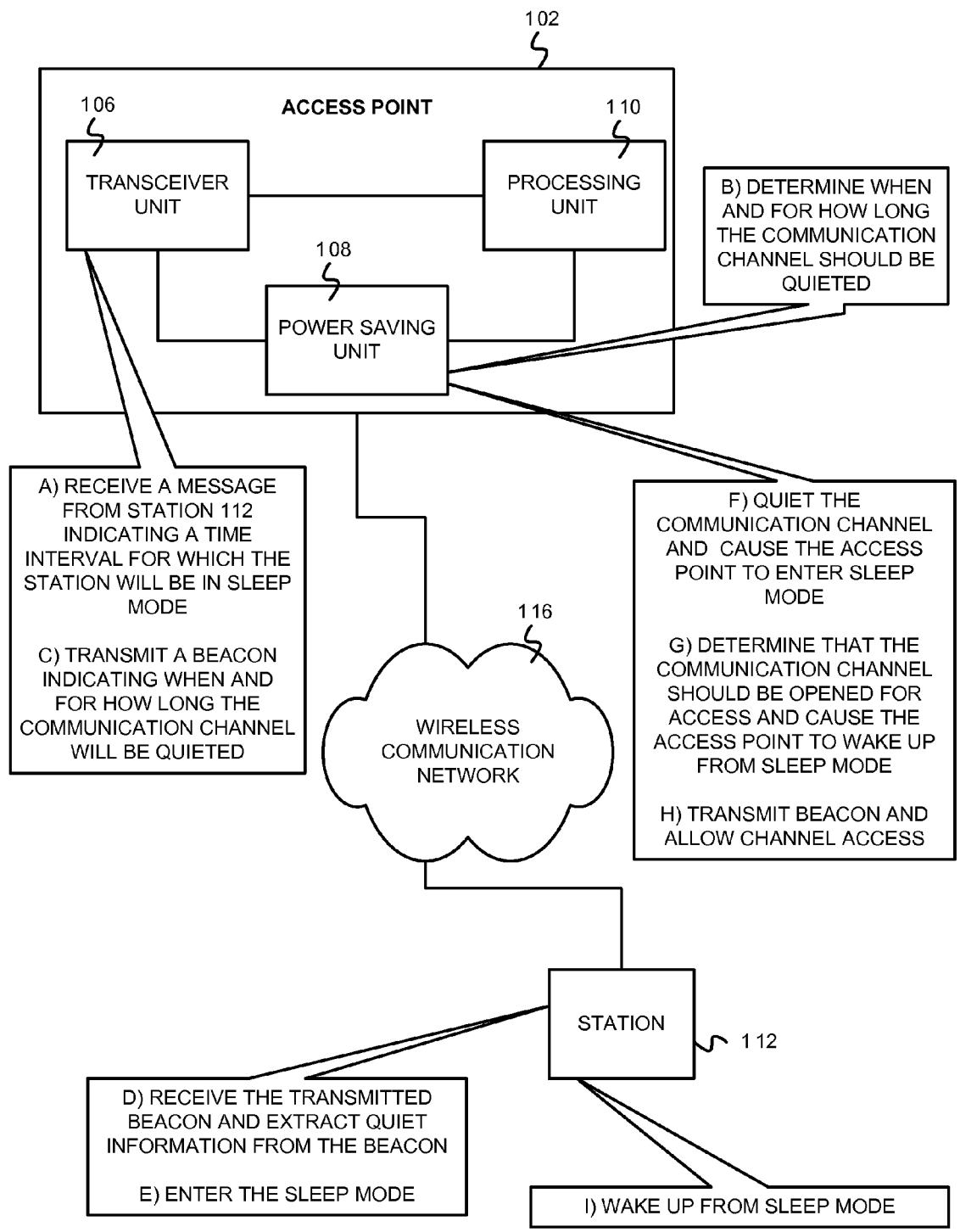
FIG. 1 is an example conceptual diagram illustrating network components configured to enable energy conservation in an access point.

FIG. 1 is an example conceptual diagram illustrating network components configured to enable energy conservation in an access point. FIG. 1 depicts an access point 102 in communication with a station 112 via a wireless communication network 116. The access point 102 can be a mobile access point or a mobile phone configured to act as an access point. In some implementations, the access point 102 can also be a fixed access point configured for implementing energy conservation mechanisms, e.g., for green computing. The access point 102 comprises a transceiver unit 106, a power saving unit 108, and processing units 110. The transceiver unit 106 is connected to the power saving unit 108 and the processing unit 110. The power saving unit 108 is also connected to the processing unit 110.

At stage A, the transceiver unit 106 in the access point 102 receives a message from the station 112 indicating a time interval for which the connected station 112 will be in sleep mode ("station sleep interval"). In some implementations, where the access point 102 and the connected station 112 communicate using IEEE communication protocols, the transceiver unit 106 can receive, in an Association Request Management Frame, one or more parameters ("quiet parameters") indicating when and for how long the station will be in the sleep mode. For example, the station 112 can indicate the quiet parameters by means of a Listen Interval in the Association Request Management Frame. The station enters the sleep mode, i.e., a low powered state, to conserve energy and preserve battery life. The station 112 may be connected to the access point 102 or may be attempting to connect to the access point 102.

At stage B, the power saving unit 108 in the access point 102 determines when and for how long the access point should quiet the communication channel and enter into a sleep mode. The power saving unit 108 can calculate how long the access point 102 remains in sleep mode based on the station sleep interval (indicated by the station 112 at stage A). The access point 102 may be connected to a plurality of stations and each station 112 connected to the access point 102 can be associated with a different station sleep interval. In other words, each of the plurality of stations can enter the sleep mode at a different time and remain in the sleep mode for a different period of time. Therefore, the power saving unit 108 calculates access point quiet information based on when and for how long each of the connected stations 112 are in sleep mode. The access point quiet information can indicate a time instant at which the access point 102 enters the sleep mode, a time instant at which the access point 102 wakes up from the sleep mode, a time interval for which the access point 102 is in sleep mode ("access point sleep interval"), etc. In the example of FIG. 1, the access point 102 is shown connected to one station 112. Therefore, the access point 102 can quiet the channel, enter the sleep mode, wake up from the sleep mode, allow access to the channel, etc. based, at least in part, on the connected station's sleep interval. In some implementations, the access point 102 can also use other information like the traffic characteristic specification (TSPEC) from the connected station 112 to determine the quiet parameters. If no stations are connected to the access point 102, the access point 102 can wake up from the sleep mode every beacon interval, transmit a beacon, wait for a response for a preconfigured period of time, and enter the sleep mode again.

At stage C, the transceiver unit 106 in the access point 102 transmits a beacon, or another suitable message, indicating the access point quiet information determined at stage B. By transmitting the access point quiet information, the access point 102 indicates, to each of the connected stations 112 and other stations that are not connected to the access point 102, when and for how long the channel will be quieted and the access point will be in sleep mode. The access point may also use the quiet information to indicate when the access point 102 wakes up from the sleep mode, exchanges data/management information, and opens up the communication channel for access. The access point 102 may also indicate how often the access point enters sleep mode, how long the access point remains in sleep mode, etc. In one implementation, the access point 102 can indicate when and for how long the access point will be in sleep mode in terms of a beacon interval time period. For example, the access point 102 can indicate, in the quiet information, that the access point 102 will enter the sleep mode at the next beacon interval, wake up after two beacon intervals, remain awake to receive and transmit information for one beacon interval, and then enter the sleep mode. In another implementation, the access point 102 can use any suitable time unit (e.g., milliseconds, etc.) to indicate when and for how long the access point 102 will quiet the communication channel and enter the sleep mode. The station 112 may use the quiet information to determine how long the communication channel will be available for access.

At stage D, the station 112 receives the transmitted beacon. The station 112 extracts the transmitted access point quiet information from the received beacon. The station 112 can use the beacon for time synchronization. The station 112 can also use the access point quiet information to identify when and for how long access to the communication channel will be blocked.

At stage E, the station 112 enters the sleep mode. In one implementation, a power unit (not shown) in the station 112 may determine that the time interval for which the station 112 will be in sleep mode has begun. The station 112 may update a station sleep timer with the station sleep interval. The station may use the station sleep timer to determine exactly when the station 112 should enter sleep mode. In one implementation, on determining that the station sleep timer has expired (e.g., counted down to zero), the power unit may cause the station 112 to enter the sleep mode. The power unit may direct the station's transceiver to stop transmitting or receiving signals. The power unit may also direct one or more other processing units in the station 112 to switch to a low powered state to conserve energy. Additionally, before the station enters sleep mode, the station (or the power unit) can update a "station available timer" with the amount of time that should elapse before the station wakes up from the sleep mode.

At stage F, the power saving unit 108 in the access point 102 determines that the access point 102 should quiet the communication channel and enter a sleep mode. As described with reference to the station 112, in one implementation, the access point 102 can also comprise an access point sleep timer. The power saving unit 108 can monitor the access point sleep timer and direct the access point 102 to enter the sleep mode when the access point sleep timer expires. For example, the power saving unit 108 can direct the transceiver unit 104 and the other processing units 110 in the access point 102 to switch to a low powered state to conserve battery power. While in the sleep mode, the access point 102 may not transmit information to or receive information from the stations 112. Thus, by transmitting the access point quiet information in the beacon (at stage B) to all stations connected to or intending to connect to the access point 102, the access point 102 ensures that no station 112 transmits information while the access point 102 is in the sleep mode.

At stage G, the power saving unit 108 determines that the communication channel should be opened for access. The power saving unit 108 may comprise a timer indicating how much time should elapse before the access point wakes up from sleep mode. When the timer reaches zero, the power saving unit 108 can trigger the access point 102 (e.g., the transceiver unit 106 and the processing units 110) to wake from the low powered state. In one implementation, the power unit 108 may use the access point sleep timer to keep track of 1) how long the access point should remain in sleep mode, and 2) when the access point should enter sleep mode. In another implementation, the power unit 108 may comprise two separate timers, a first timer for determining when the access point should enter sleep mode (i.e., the access point sleep timer) and a second timer for determining when the access point should wake up from sleep mode.

At stage H, the transceiver unit 104 transmits a beacon on the communication channel. The access point 102 wakes up from sleep mode, opens access to the communication channel, and transmits a beacon in time for the connected station 112 to receive the beacon and maintain connectivity with the access point 102. In transmitting the beacon, the access point 102 can indicate that the communication channel is available for contention-based access.

At stage I, the station 112 wakes up from the sleep mode. In one implementation, on determining that the station available timer has expired (e.g., counted down to zero), the power unit can cause the station 112 to wake up from the sleep mode. The station 112 wakes up from sleep mode in time to receive the beacon transmitted by the access point (at stage H) and maintain connectivity with the access point 102. The station 112 can also update the station sleep timer to indicate when the station should enter the sleep mode again. The station 112 can also transmit data and/or management information (if any) to the access point 102.

Figure 2:
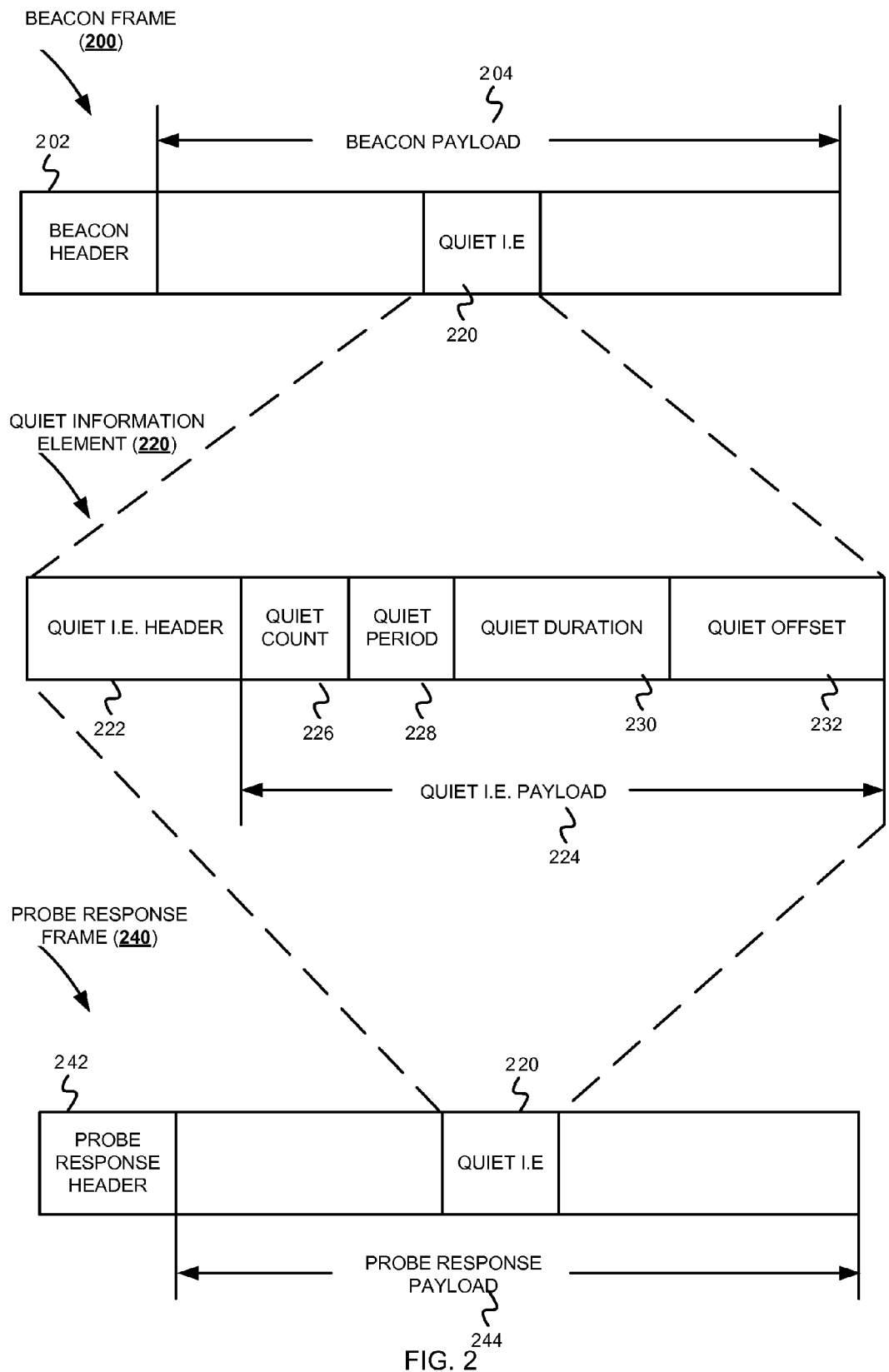
FIG. 2 illustrates example frame formats for transmission of management information.

In one implementation, communication between the access point 102 and the station 112 may be governed by a set of standards, defined by the Institute of Electrical and Electronics Engineers (IEEE) 802.11 committee, for Wireless Local Area Network (WLAN) communication. The IEEE 802.11 standards define frame formats for transmission of data and management information. It is noted, however, that in other implementations, the communication between the access point 102 and the station 112 may be governed by other existing or future standards (or amendments to current standards), e.g., 802.16, or by proprietary protocols implemented by the network components. FIG. 2 illustrates example frame formats for transmission of management information. FIG. 2 illustrates frame formats for a beacon frame 200, a quiet information element (Quiet I.E) 220, and a probe response frame 240 in accordance with IEEE 802.11 communication standards. An access point (e.g., the access point 102 of FIG. 1) can transmit a beacon frame 200 for time synchronization between one or more connected stations (e.g. station 112 of FIG. 1) and the access point 102. The access point 102 can also use the beacon frame 200 to transmit the access point quiet information and to inform stations if they are to receive data frames from the access point 102. The beacon frame comprises a beacon header 202 and a beacon payload 220. The beacon header 202 comprises control information (e.g., frame number) while the beacon payload can comprises information about the communication channel (e.g., channel frequency, a service set identifier, data rates supported on the communication channel, etc.), a beacon interval (i.e., a time period between transmission of beacon frames), etc.

Additionally, the beacon payload 204 comprises the quiet information element (Quiet I.E) 220. The access point 102 can use the Quiet I.E 220 to temporarily quiet the communication channel and enter sleep mode to prolong battery life. The Quiet I.E 220 comprises a Quiet I.E header 222 and a Quiet I.E payload 224. The Quiet I.E payload 224 comprises a Quiet Count 226, a Quiet Period 228, a Quiet Duration 230, and a Quiet Offset 232. The Quiet Count 226 indicates a number of target beacon transmission time (TBTT) until the beacon interval during which the quiet interval begins. In other words, the Quiet Count 226 indicates when the access point will quiet the communication channel. The Quiet Period 228 indicates a number of beacon intervals between consecutive quiet intervals (e.g., how often the access point enters sleep mode). The Quiet Duration 230 indicates a time period for which the access point quiets the communication channel and enters sleep mode. The Quiet Offset 232 indicates an offset (if any) within a beacon interval when the next quiet period will begin (e.g., if the Quiet Duration does not coincide with the start of a beacon interval).

Additionally, the access point 102 can also transmit the Quiet I.E 220 as part of the probe response frame 240. The probe response frame 240 comprises a probe response header 242 and a probe response payload 244. The access point 102 transmits a probe response frame 240 in response to a probe request frame from the station scanning the communication channels for existing networks and access points. The probe response frame 240 comprises information similar to the beacon frame 200. The probe response payload 244 comprises the Quiet I.E 220 along with other information such as channel frequency, the service set identifier, data rates supported on the communication channel, etc.

Figure 3:
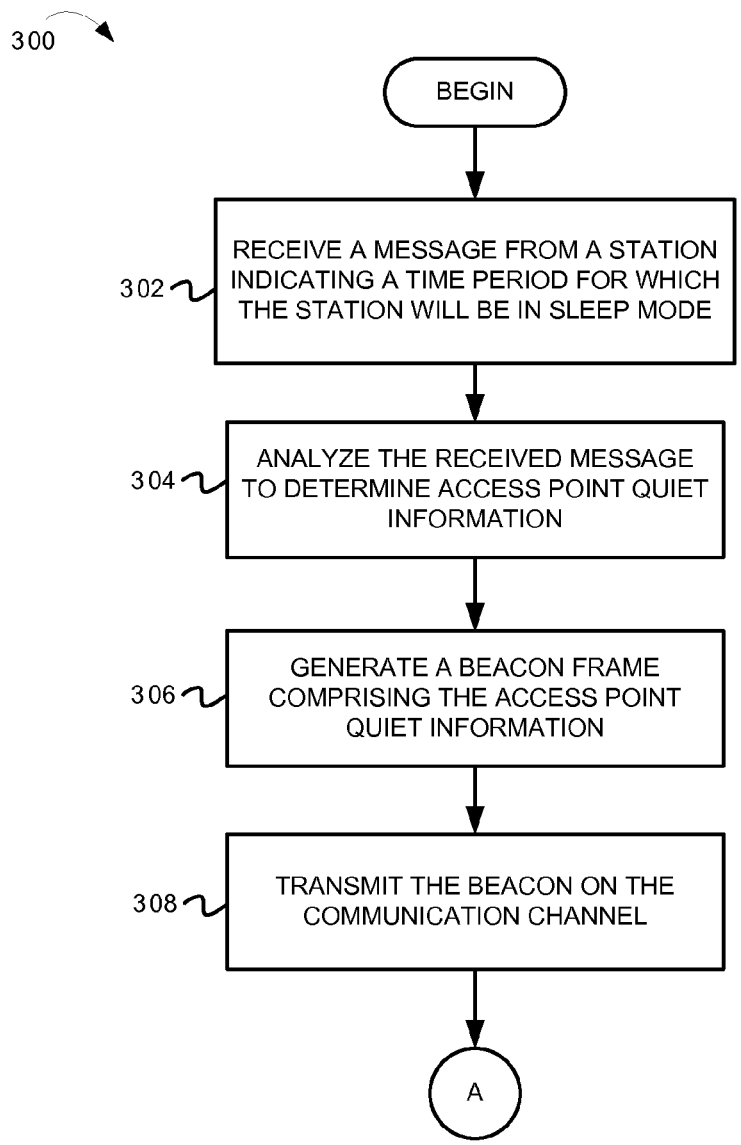
FIG. 3 depicts a flow diagram illustrating example operations for an access point configuring a quiet interval.
Figure 4:
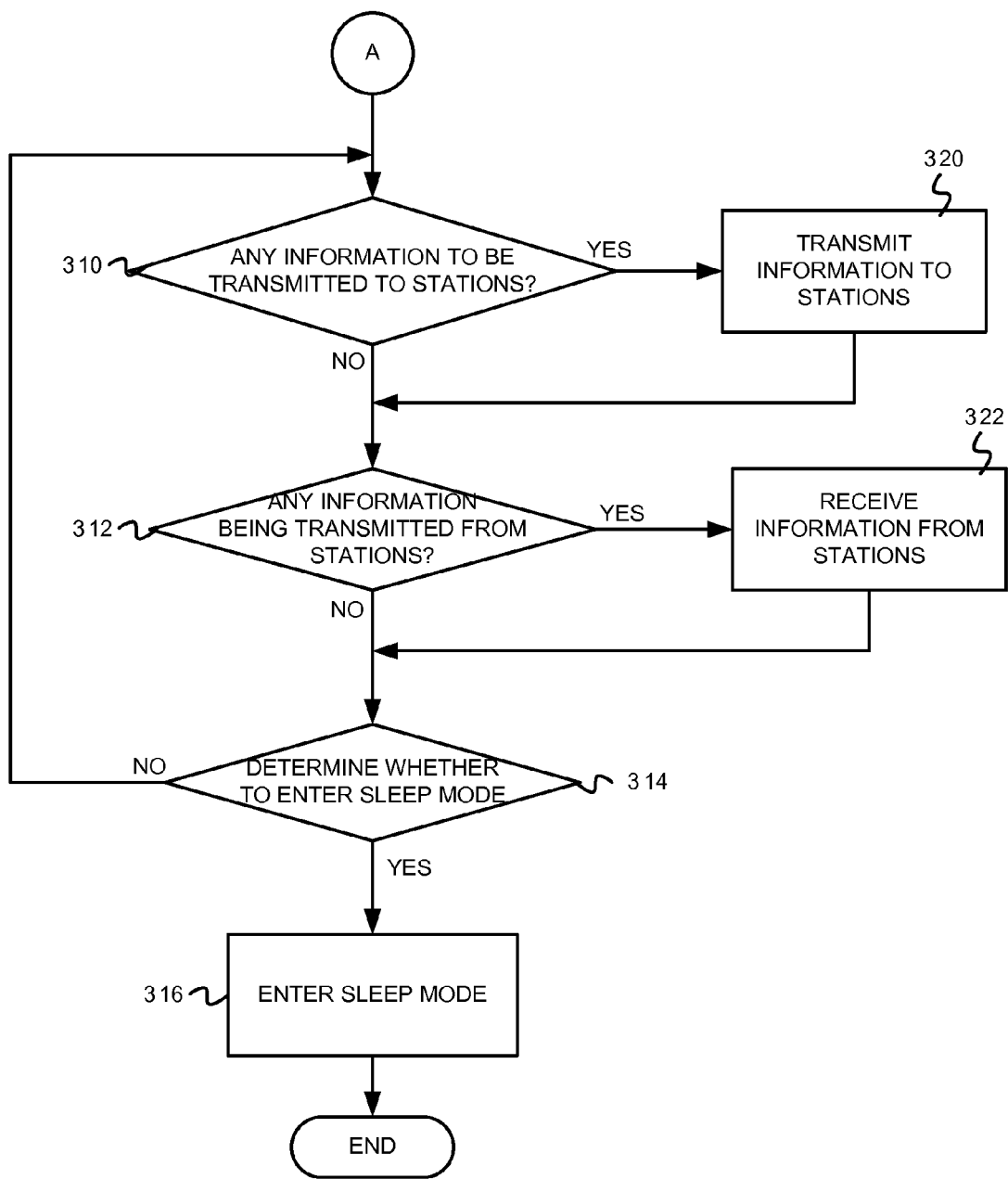
FIG. 4 depicts a flow diagram illustrating example operations for an access point configuring a quiet interval.

FIG. 3 and FIG. 4 depict a flow diagram illustrating example operations for an access point configuring a quiet interval. Flow 300 begins at block 302 in FIG. 3.

At block 302, a message is received from a station indicating a time interval for which the station will be in sleep mode ("station sleep interval"). For example, the station 112 of FIG. 1 may indicate, to the access point 102, how often the station will wake up from sleep mode to receive frames from the access point, when the station will enter the sleep mode, etc. In one implementation, the access point can be mobile phone acting as an access point. In another implementation, the access point can be a fixed access point. It is noted, however, that in other implementations the access point can be other types of access points that can operate using either battery power or an external power source. In one implementation, a station complying with IEEE 802.11 communication standards may indicate how often the station listens (on the communication channel) for beacon frames in a Listen Interval in an Association Request Management Frame. The Listen Interval is typically indicated as a number of beacon intervals for which the station will be in the sleep mode. For example, a station with a Listen Interval of 2 will receive only alternate beacons (i.e., the station will be in the sleep mode for two beacon intervals). The access point may receive Association Request Management Frames (or other messages indicating a time instant and/or the time interval for which the station will be in sleep mode) from one or more stations connected to or intending to connect to the access point. The flow continues at block 304.

At block 304, the message indicating the station sleep interval is analyzed to determine access point quiet information. For example, the power saving unit 108 in the access point 102 can analyze the message received (at block 302) to determine the access point quiet information (e.g., access point sleep interval, when the access point wakes up from the sleep mode, etc). As described earlier, stations operating in a power save mode typically go to sleep to conserve power and wakeup only for a predetermined number of beacon intervals. The access point can use information indicating when and for how long the station goes to sleep (as indicated, e.g., in the Listen Interval) to determine when and for how long the access point can lock the communication channel and enter a sleep mode. For example, if a station connected to the access point wakes up every fifth beacon interval, it may be sufficient for the access point to wakeup just before the start of the fifth beacon interval and transmit a beacon frame in time for the connected station to receive the beacon frame. If there are multiple stations connected to the access point, the access point can calculate a least common factor of the station sleep interval (e.g., the Listen Interval) associated with each of the connected stations and accordingly determine when to wake up from sleep mode. For example, if three stations with Listen Intervals 3, 6, and 9 respectively are connected to the access point, then the access point may transmit a beacon once every three (the least common factor of 3, 6, and 9 is 3) beacon intervals to ensure that the stations remain connected to the access point. After the access point determines the access point quiet information, the flow continues at block 306.

At block 306, a beacon frame comprising the access point quiet information is generated. For example, the access point 102 may generate the beacon frame. In one implementation, the beacon frame may be in the format described with reference to FIG. 2 (see beacon frame 200 of FIG. 2). The access point may also indicate the access point quiet information in a probe response frame (e.g., the probe response frame 240 of FIG. 2). In another implementation, the access point may notify the stations of the access point quiet information using other suitable message formats. The flow continues at block 308.

At block 308, the beacon frame (generated at block 306) is transmitted on the communication channel. The beacon frame is transmitted to all the stations listening on the communication channel. The beacon ensures that stations that are connected to the access point remain connected to and are in synchronization with the access point. In transmitting the beacon, the access point can advertise its presence and inform stations listening on the communication channel of the access point's capabilities (e.g., access point identifier, data rates supported, etc). As described earlier, the beacon frame is also used to transmit the access point quiet information and notify the stations of when and for how long the communication channel will be quieted. By transmitting the access point quiet information, the access point can control access to the communication channel during the time the access point is in sleep mode. Thus, the access point can also control transmissions from the connected stations to the access point. The flow continues at block 310 in FIG. 4 (see connector A).

At block 310, it is determined whether there exists information to be transmitted to the connected stations. The access point may access a buffer comprising pending data frames to be transmitted to determine if there exists data to be transmitted to the connected stations. In some implementations, the access point may also transmit management information to connected stations and/or stations that wish to connect to the access point. For example, the access point may determine that an association response frame should be transmitted in response to the station transmitting an association request frame to connect to the access point's network. If it is determined that there exists information to be transmitted to the stations, the flow continues at block 320. Otherwise, the flow continues at block 312.

At block 320, the information is transmitted to the stations. For example, the access point 102 may transmit data frames to the connected station 112. In some implementations, the access point may determine whether there is sufficient time for data transmission before the stations and the access point enter a sleep mode. In one example, the access point may access an access point sleep timer and determine the amount of time remaining until the access point quiets the communication channel and enters the sleep mode. The access point can calculate the amount of time required for data transmission based on data rate, frame length, etc. If the access point determines that the stations will be awake to receive all the data to be transmitted, the access point transmits the data. Otherwise, the access point can buffer frames destined for the connected stations and alert the stations (e.g., via a beacon, a traffic indication map (TIM), etc.) when the stations and the access point wake up from sleep mode. The flow continues at block 312.

At block 312, it is determined whether a station is transmitting information. The station (e.g., the station 112) may transmit data or management information to the access point (e.g., the access point 102). For example, a station connected to the access point may transmit one or more data frames. As another example, a station connected to the access point may transmit a disassociation frame to the access point to terminate a connection with the access point. As another example, a station trying to connect to the access point may transmit an Association Request frame to request a connection with the access point. The stations can transmit data and management information using other suitable communication protocols. If it is determined that the station is transmitting data, the flow continues at block 322. Otherwise, the flow continues at block 314.

At block 322, information is received from the stations. For example, the access point 102 of may receive data and/or management information from the station 112. The flow continues at block 314.

At block 314, it is determined whether the access point should enter the sleep mode. For example, the power saving unit 108 in the access point 102 may determine that the access point should enter the sleep mode. As described earlier, the access point may comprise an access point sleep timer indicating the amount of time that should elapse before the access point quiets the communication channel and enters sleep mode. The power saving unit 108 may trigger one or more operating units (e.g., a transceiver unit, etc.) in the access point to enter the sleep mode when the value of the access point sleep timer reaches zero. If it determined that the access point should enter sleep mode, the flow continues at block 316. Otherwise, the flow continues at block 310, where the access point determines whether there is data to be transmitted to or data to be received from a station.

At block 316, the access point enters the sleep mode. For example, the power saving unit 108 in the access point 102 may direct the transceiver unit 106 and other processing units 110 in the access point 102 to switch to a low powered state to conserve battery power. Before the access point enters the sleep mode, the access point also quiets the communication channel (i.e., locks access to the communication channel). The stations connected to the access point set a station timer (e.g., a network allocation vector (NAV) timer) indicating a time (e.g., Quiet Duration 230 from the Quiet I.E 220 of FIG. 2) that should elapse before the access point wakes up from sleep mode. After the stations update the station timer, the communication channel is locked. By locking the communication channel before entering sleep mode, the access point ensures that stations do not transmit data or management frames to the access point when the access point is in sleep mode. A timer may also be updated to indicate the time (e.g., Quiet Duration 230 of FIG. 2) that should elapse before the access point wakes up from sleep mode. From block 416, the flow ends.

After the access point wakes up from sleep mode, the access point opens the communication channel for contention-based access and transmits the beacon. The access point also transmits data and/or management frames that it has for the connected stations and remains awake for a predetermined time interval to receive any data and/or management frames from the connected stations or stations that wish to connect to the access point. The access point then locks access to the communication channel and enters the sleep mode again.

Figure 5A:
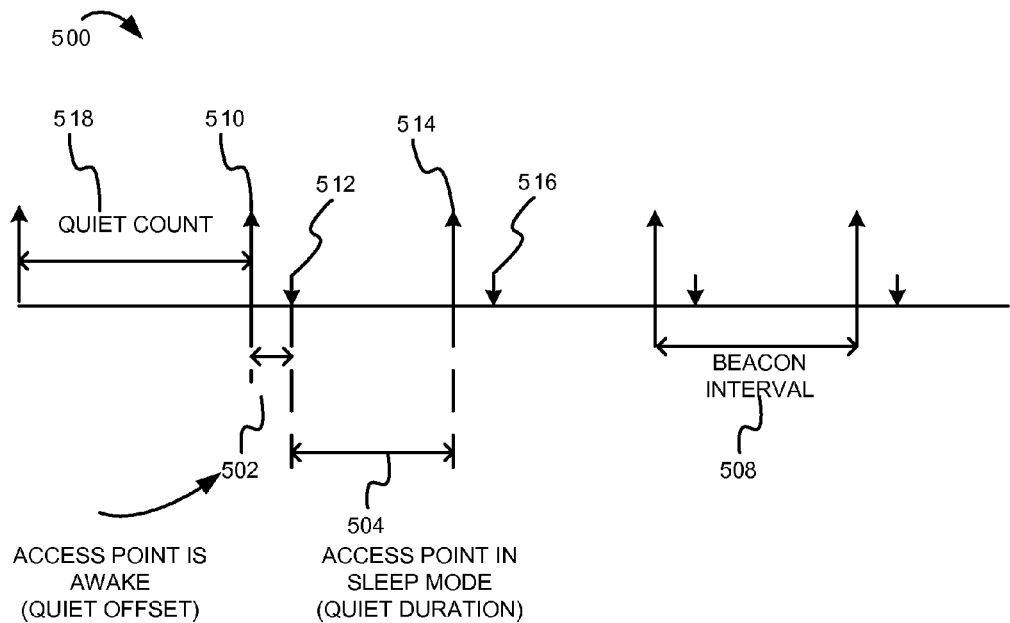
FIG. 5A is a timing diagram illustrating example transmission operations when no stations are connected to an access point.

The various time intervals associated with the access point configured for energy conservation are further described using timing diagrams 5A and 5B. FIG. 5A is a timing diagram 500 illustrating example transmission operations when no stations are connected to the access point. Time interval 502 indicates the interval during which the access point (e.g., access point 102) is awake. Stations (e.g., station 112) can communicate with the access point during the interval 502. For example, a station may detect a beacon 510 transmitted by the access point and transmit an Association Request frame to request a connection to the access point. Time interval 504 indicates an interval during which the access point is in sleep mode. The sleep mode is a low power state, which the access point enters to conserve energy and enhance battery life. The access point transmits a Quiet Information Element (Quiet I.E) in the beacons or probe response frames (transmitted in response to the probe request frames) during time interval 502 (i.e., before the access point enters sleep mode). The access point uses the Quiet I.E to indicate when and for how long the access point will be in sleep mode (i.e., the time interval 504). In other words, the access point locks the communication channel for the interval indicated by the time interval 504 and does not receive communications from or transmit communications to other stations.

Arrowhead 510 indicates a time instant at which the access point wakes up (e.g., just before a predetermined target beacon transmission time (TBTT)) to transmit the beacon. Arrowhead 512 indicates a time instant at which the Quiet Offset (as indicated in the Quiet I.E.) begins and the access point enters the sleep mode. Thus, the quiet time interval 504 repeats every beacon interval 508. Because the access point is not connected to any station, the access point wakes up every beacon interval 508 (which is the sum of time intervals 502 and 504) to transmit the beacon as depicted by arrowheads 510 and 514. Likewise, the access point enters sleep mode every beacon interval (see arrowheads 512 and 516).

In one implementation, the access point configures the Quiet I.E frame (see Quiet I.E frame format 220 in FIG. 2) by assigning a Quiet Count 518 of 1 beacon interval and a Quiet Period of 1 indicating that the quiet period starts at the next TBTT (denoted by arrowhead 510) and that the quiet period repeats every beacon interval. The access point can also configure the quiet duration to time interval 504 indicating that the communication channel should be quiet for the time period indicated by time interval 504. Likewise, the access point can configure the quiet offset to time interval 502 indicating that the quiet period starts after time interval 502.

Figure 5B:
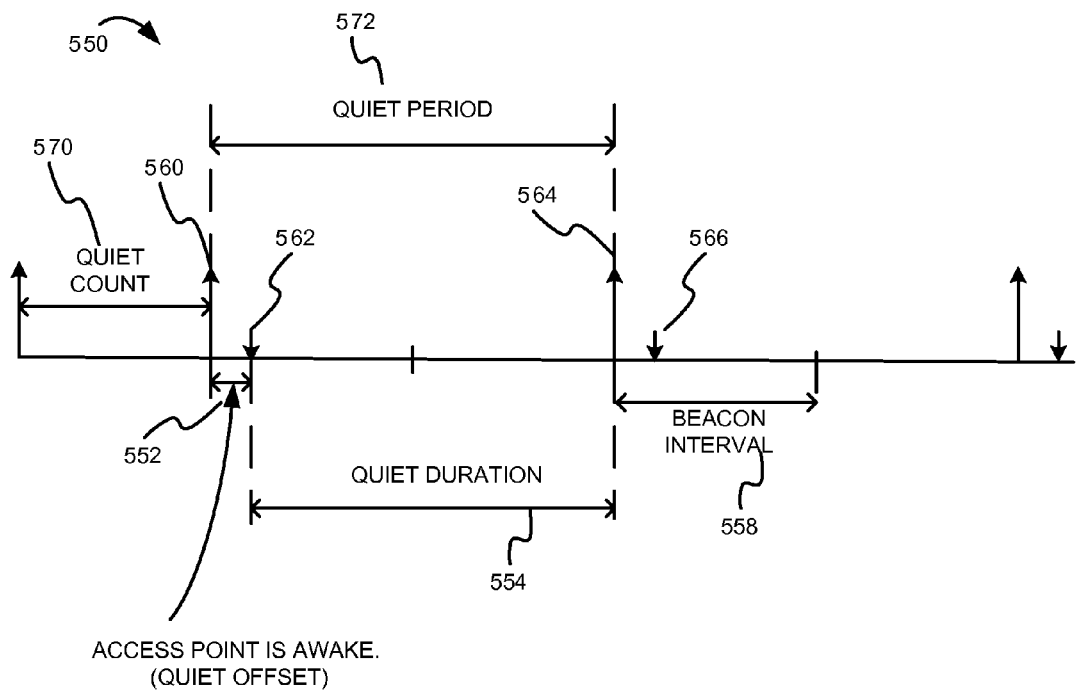
FIG. 5B is a timing diagram illustrating example transmission operations for an access point connected to a station.

FIG. 5B is a timing diagram 550 illustrating example transmission operations for an access point connected to a station. In the example shown in FIG. 5B, the connected station (e.g., the station 112) is connected to the access point (e.g., the access point 102) with a Listen Interval (indicated in an Association Request Management Frame) of two beacon intervals. The connected station uses the Listen Interval to indicate to the access point that the station will wake up every second beacon interval to listen for beacons (for synchronization) from and exchange data and/or management information with the access point.

Time interval 552 indicates the interval during which the access point is awake. The access point and the connected station can exchange data and management frames during this interval. For example, the connected station may transmit a data frame to the access point. As another example, the access point can indicate to a station (e.g., by transmitting a Traffic Indication Map (TIM)) if the access point has data/management frames for the station. New stations (stations that are not connected to the access point) can also communicate with the access point during the interval 552. For example, a station may detect a beacon transmitted by the access point during the time interval 552 and transmit an Association Request frame to request a connection to the access point. Time interval 554 indicates an interval during which the access point is in sleep mode.

With reference to the Quiet I.E. frame structure 220 depicted in FIG. 2, the access point can configure the Quiet I.E frame based on the station's Listen Interval (two beacon intervals). The access point can configure the Quiet I.E with a Quiet Count 570 of 1 beacon interval and a Quiet Period 572 of 2 beacon intervals indicating that the quiet period starts at the next TBTT (see arrowhead 560) and that the quiet period repeats every second beacon interval (see arrowhead 564). The access point can also configure the Quiet Duration to time interval 554 indicating that the communication channel should be quiet for the time period indicated by time interval 554. Likewise, the access point can configure the Quiet Offset to time interval 552 indicating that the quiet period starts after time interval 552.

Arrowhead 560 indicates a time instant at which the access point wakes up (e.g., just before the TBTT) to transmit the beacon. Arrowhead 562 indicates a time instant at which the Quiet Offset (as indicated in the Quiet I.E.) begins and the access point enters the sleep mode. As depicted by arrowheads 560 and 564, the access point wakes up every second beacon interval 558 to transmit beacons, probe responses, data frames, etc. Also, as depicted by arrowheads 562 and 566, the quiet duration 554 repeats every second beacon interval 558.

It should be noted that the time intervals during which the access point is awake and in sleep mode and the beacon interval are configurable. The user can configure any one or all of the time intervals depending on the type and nature of the traffic that is estimated to pass through the access point. Additionally, the user may also configure the access point to dynamically configure the time intervals that the access point is awake and in sleep mode based on the traffic handled by the access point.

Figure 6:
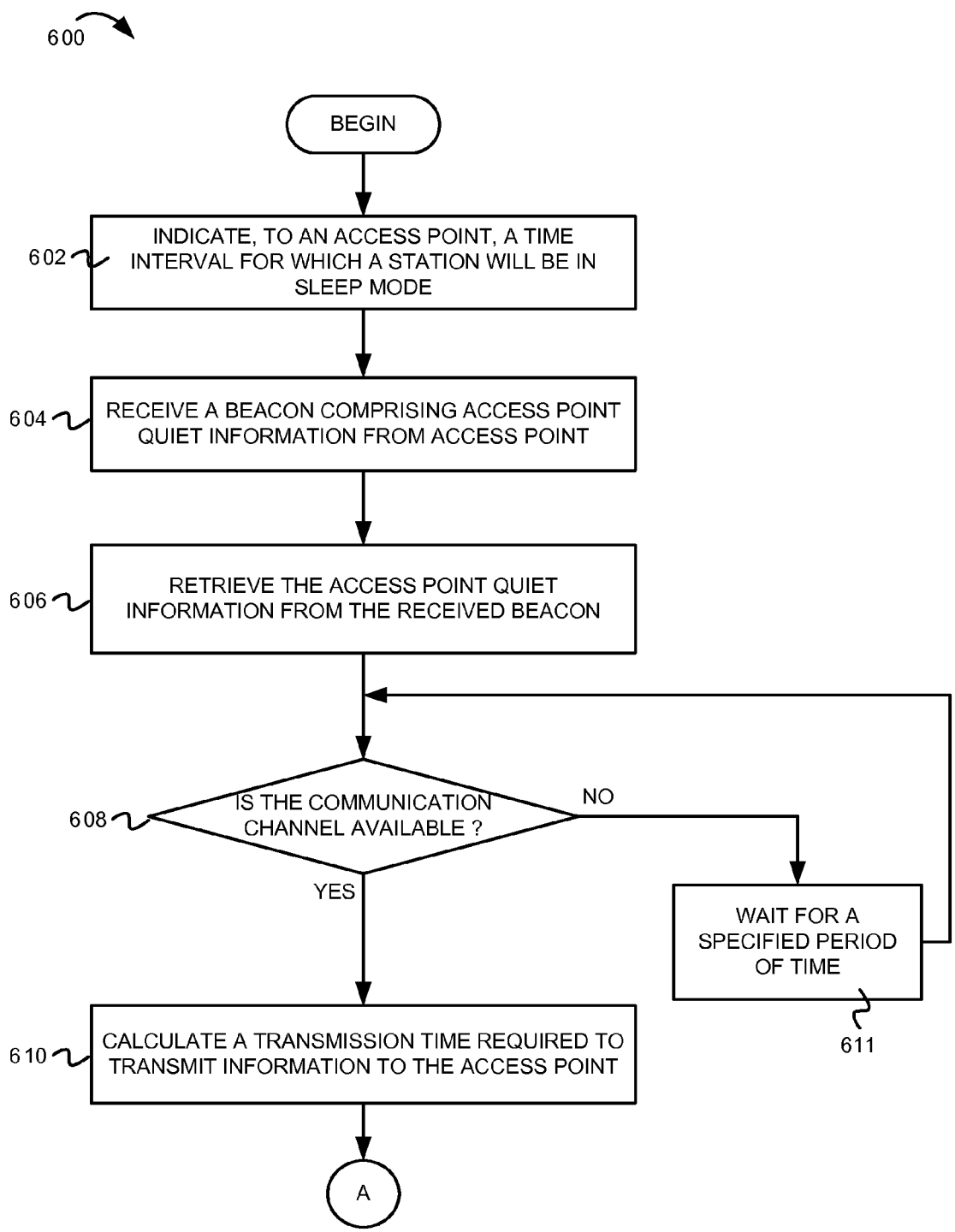
FIG. 6 depicts a flow diagram illustrating example operations for a station connected to an access point.
Figure 7:
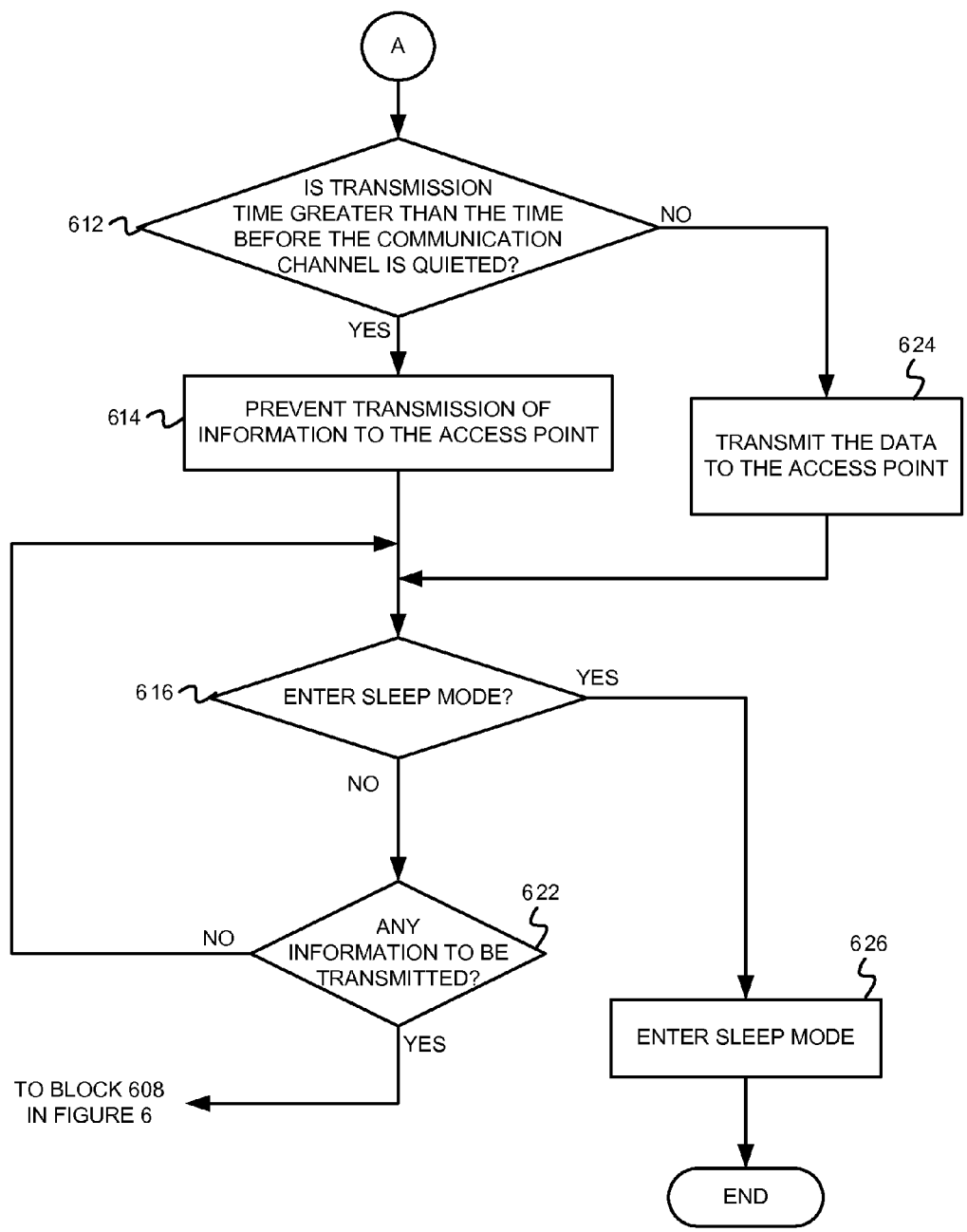
FIG. 7 depicts a flow diagram illustrating example operations for a station connected to an access point.

FIG. 6 and FIG. 7 depict a flow diagram illustrating example operations for a station connected to an access point. Flow 600 begins at block 602 in FIG. 6.

At block 602, a time interval for which the station will be in sleep mode is provided to an access point. For example, the station 112 may send a message indicating to the access point 102 a number of beacon intervals it intends to spend in sleep mode. In one implementation, the station can indicate a station sleep interval (i.e., the number of intervals the station will be in sleep mode) by configuring a Listen interval in an Association Request Management frame. In some implementations, the station sleep interval may not be described as multiples of the beacon interval. Instead, the station may use any suitable unit of time (e.g., seconds, milliseconds, etc.) to indicate the station sleep interval and a time interval at which the station sleep interval repeats (if applicable). Also, the station may use any suitable message format and/or frame format (agreed upon by the access point and the station) to communicate with the access point. The flow continues at block 604.

At block 604, a beacon comprising access point quiet information is received from the access point. For example, the station 112 receives a beacon (e.g., the beacon frame 200 of FIG. 2) from the access point 102. As described in FIG. 3 (see discussion for blocks 302 and 304), in one implementation, the access point can receive Association Request Management frames indicating Listen Intervals from a plurality of connected stations. The access point can calculate an access point quiet interval from the received Listen Intervals and transmit the access point quiet interval as part of the quiet information in a beacon frame. During the access point quiet interval, the access point can enter the sleep mode and block access to the communication channel. The flow continues at block 606.

At block 606, the access point quiet information is retrieved from the beacon received at block 604. For example, the station 102 may process the received beacon to extract the access point quiet information. In one implementation, the station may extract the quiet information element (e.g., the Quiet I.E 220 of FIG. 2) from the beacon to determine when the quiet duration starts, the length of the quiet duration, when data and management information can be transmitted, etc. The stations can also update a Network Allocation Vector (NAV) timer with the Quiet Duration (i.e., the Quiet duration 230 of FIG. 2) indicated in the Quiet Information Element. The NAV timers count down so that the stations wake up in time to receive the beacon transmitted by the access point. In another implementation, the station may retrieve the access point sleep interval from the access point quiet information (transmitted using any suitable message format and communication protocol) and accordingly update a station available timer. The flow continues at block 608.

At block 608, it is determined whether the communication medium is available. For example, for contention-based communication channel access, the station 112 may transmit a request-to-send (RTS) frame on the communication channel to the access point 102 to determine if the communication medium is available. The station may also indicate an amount of time for which the communication channel will be in use. The access point may transmit a clear-to-send (CTS) signal to one of the stations contending for the communication channel to indicate that the communication channel is available for transmission. Other stations may also receive the RTS/CTS signal and refrain from accessing the communication channel during the time interval when another station is transmitting. If it is determined that the communication medium is available for data transmission, the flow continues at block 610. Otherwise, the flow continues at block 611.

At block 611, on determining that the communication medium is not available for transmission, the station waits for a specified period of time. In the contention-based channel access example described with reference to block 608, other stations that do not receive permission to transmit along the communication channel also receive the RTS/CTS frames. The stations can update a timer and wait until the transmitting station has released the communication channel. In one implementation, the station may wait for a random amount of time before it senses the communication channel to avoid frame collision. In another implementation, the station waits for the period of time specified in an RTS frame transmitted by a station that is currently transmitting. The flow continues at block 608, where, after the specified period of time, the station senses the communication channel to determine whether the communication channel is available.

At block 610, a time period required to transmit information ("transmission time") to the access point is calculated. For example, the station 112 may calculate the time period required for transmission of a data/management frame to the access point 102. The transmission time may be calculated based on a number of bytes of data to be transmitted, frame size, the capacity and data rate of the communication channel, the network traffic, a network model, etc. The flow continues at block 612 in FIG. 7.

At block 612, it is determined whether the transmission time is greater than the time before the communication channel is quieted. In other words, it is determined whether there is sufficient time to transmit information to the access point before the access point quiets the communication channel and enters sleep mode. In a communication environment using IEEE communication protocols, it may be determined whether there is sufficient time to transmit information to the access point before the start of the next Quiet Duration (e.g., the Quiet Duration 230 of FIG. 2). For example, the transmission time may be compared with an amount of time indicated by a station sleep timer. Stations that are not connected to the access point may determine whether the transmission time is greater than the time that should elapse before the access point locks the communication channel and enters a sleep mode. If it is determined that the time required for data transmission is greater than the time before the communication channel is quieted, the flow continues at block 614. Otherwise, the flow continues at block 624.

At block 624, the data is transmitted to the access point. The station connected to the access point transmits information in response to the station determining that the transmission time is less than the amount of time that should elapse before the access point quiets the communication channel and enters sleep mode (e.g., before the start of the Quiet Duration). A station that is not connected to the access point transmit information to the access point in response to the station determining that the transmission time is less than the amount of time that should elapse before the access point quiets the communication channel. The station can transmit a data frame or a management frame to the access point. For example, a station may transmit a Probe Request Frame to scan for an existing and compatible access point, a data frame to transmit data to a second station via the access point, etc. The flow continues at block 616.

At block 614, information is prevented from being transmitted to the access point. The flow 600 moves from block 612 to block 614 if it is determined that the transmission time is greater than the time before the access point quiets the communication channel and enters sleep mode (e.g., before the start of the Quiet Duration). For example, the station 112 prevents the transmission of data and/or management information to the access point 102 in response to the station determining that the transmission time is greater than the time before the start of the Quiet Duration. The information to be transmitted may be stored (e.g., in a buffer frame) and may be transmitted when the station wakes up from the sleep mode. In another implementation, stations that are not connected to the access point may store information to be transmitted and may transmit the information (e.g., management frames requesting connectivity) when the access point wakes up from the sleep mode and opens access to the communication channel. After the station determines whether it should transmit information (see block 624) or prevent transmission of the information (see block 614), the flow continues at block 616.

At block 616, it is determined whether the station should enter sleep mode. As described earlier, the stations may update a local timer with the amount of time that should elapse before the station enters sleep mode. In one implementation, the station sleep timer may count down, triggering the station to enter sleep mode when the counter reaches zero. If it is determined that the station should enter sleep mode, the flow continues at block 626. Otherwise, the flow continues at block 622.

At block 622, it is determined whether there is any information to be transmitted. For example, the station 122 may determine whether there exist any data and/or management frames to be transmitted to the access point 102. If the station determines that there exists information that should be transmitted to the access point, the flow continues at block 608 in FIG. 6 where the station determines whether the communication channel is available. Otherwise, the flow continues at block 616 where the station determines whether it should enter sleep mode.

At block 626, the station enters sleep mode. As described earlier, the stations may update a station available timer with the amount of time that the communication channel is quieted and the access point is in the sleep mode, as indicated by the access point. In one implementation, the station 112 may update its NAV timer with the Quiet Duration 230 indicated in the Quiet I.E 220 of FIG. 2. As the stations are in the sleep mode, the NAV timer counts down triggering the stations to wake up when the NAV timer reaches zero. In some implementations, the stations may use any suitable counter/timer to indicate when stations can enter or wake up from the sleep mode. From block 626, the flow ends.

It should be understood that the depicted flow diagrams (FIGS. 3, 4, 6, and 7) and the timing diagram (FIG. 5) are examples meant to aid in understanding embodiments and should not be used to limit embodiments or limit scope of the claims. Embodiments may perform additional operations, fewer operations, operations in a different order, operations in parallel, and some operations differently. For example, FIG. 7 describes the station determining whether there is sufficient time for transmission before the communication channel is quieted (see block 612). However, in some implementations, the onus to determine whether the station should be allowed to transmit may be on the access point. For example, the station may transmit an RTS signal to the access point indicating the frame length, transmission time, etc. The access point may determine that the transmission time is greater than the time before the access point quiets the communication channel. The access point may prevent the station from transmitting information.

Also, because the access point is awake and can transmit/receive data and/or management information for only a pre-defined period of time, there may be a trade-off between the access point's performance and power saving for prolonged battery life. In some implementations, the access point can be configured to operate in full power mode when one or more stations are connected to the access point. The access point may enter into power saving mode (i.e., sleep mode) and wake up for a limited time interval when there are no stations connected to the access point.

As described above, in some embodiments, the access point is configured to quiet the communication medium (i.e., the communication channel) by transmitting a quiet information element (Quiet I.E.) in the beacon frame and/or a probe response frame. However, in some implementations, the access point and/or one or more of the connected stations may not support receiving the Quiet I.E. In some implementations, the access point can quiet the communication channel using a CTS (Clear-to-Send) to self scheme. The CTS-to-self scheme is a generic scheme that is recognized by all clients (e.g., connected stations, transmitting stations, mobile phones, access points, etc.) implementing IEEE 802.11 communication standards. A CTS signal indicates a duration for which a station is allowed to transmit data on the communication channel. The CTS signal also indicates, to other stations, the duration for which the communication channel will be busy and therefore, should not be accessed. The access point can transmit a CTS signal to itself indicating a time interval for which the communication channel will be locked (e.g., the Quiet Duration, the access point sleep interval, etc). The CTS signal, which is also received by other stations, indicates the other stations should not access the communication channel for the indicated time interval. The access point can enter the sleep mode on transmitting the CTS signal. This can ensure that no station transmits data or management frames to the access point while the access point is in the sleep mode. This also ensures that no data or management information is lost while the access point is in sleep mode.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 8:
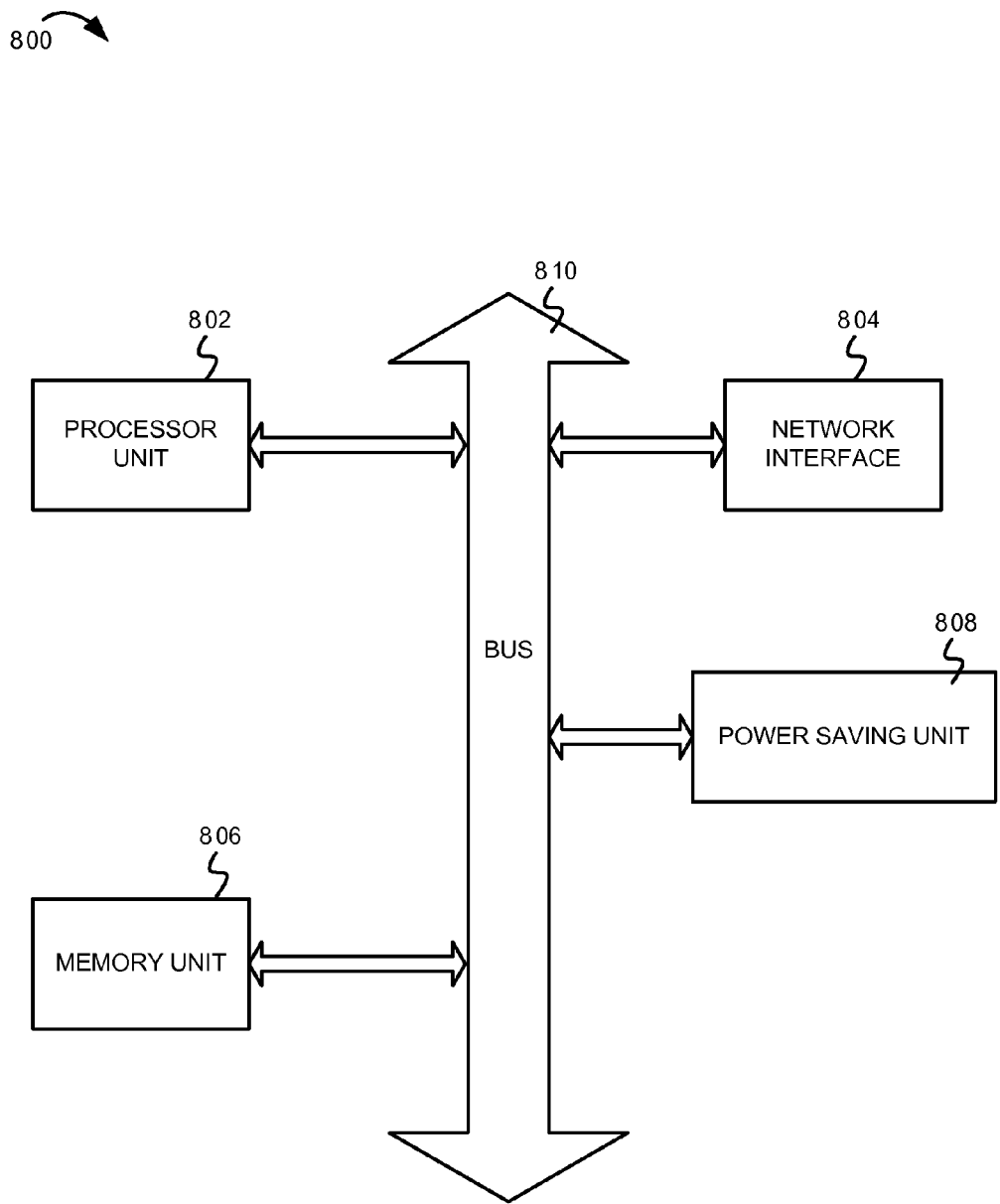
FIG. 8 depicts an example wireless device including a mechanism for energy conservation at access points.

FIG. 8 depicts an example wireless device e.g., WLAN device 800. In one implementation, the WLAN device 800 may be a WLAN station (e.g., station 112 of FIG. 1). In another implementation, the WLAN device 800 may be an access point operating in an 802.11 WLAN communication environment (e.g., access point 102 of FIG. 1). The WLAN device 800 includes a processor unit 802 (possibly including multiple processors, multiple cores, multiple nodes, and/or implementing multi-threading, etc.). The WLAN device 800 includes a memory unit 806. The memory unit 806 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The WLAN device 800 also includes a bus 810 (e.g., PCI, ISA, PCI-Express, HyperTransport®, InfiniBand®, NuBus, etc.), and network interfaces 804 that include at least one wireless network interface (e.g., a WLAN interface, a Bluetooth® interface, a WiMAX interface, a ZigBee® interface, a Wireless USB interface, etc.). The WLAN device 800 also includes a power saving unit 808. The power saving unit 808 comprises functionality for conserving power to prolong battery life in an access point described in accordance with FIGS. 1-7.

Any one of the above-described functionalities may be partially (or entirely) implemented in hardware and/or on the processing unit 802. For example, the functionality may be implemented with an application specific integrated circuit, in logic implemented in the processing unit 802, in a coprocessor on a peripheral device or card, etc. Further, realizations may include fewer or additional components not illustrated in FIG. 8 (e.g., additional network interfaces, peripheral devices, etc.). The processor unit 802 and the network interfaces 804 are coupled to the bus 810. Although illustrated as being coupled to the bus 810, the memory 806 may be coupled to the processor unit 802.

While the embodiments are described with reference to various implementations and exploitations, it will be understood that these embodiments are illustrative and that the scope of the inventive subject matter is not limited to them. In general, the dynamic energy saving mechanism for access points as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for reducing power consumption in an access point, the method comprising:
   receiving a message at the access point from a first station, via a wireless communication channel, indicating a first station sleep interval associated with the first station, wherein the first station sleep interval indicates a time interval in which the first station will enter a sleep mode;
   calculating a first access point quiet information comprising a first access point sleep interval based, at least in part, on the first station sleep interval, wherein the first access point sleep interval indicates a time interval in which the access point will enter a sleep mode;
   transmitting to the first station, via the wireless communication channel, a beacon indicating the first access point quiet information to prevent the first station from initiating transmissions to the access point during the first access point sleep interval;
   determining, based on the first access point quiet information, a start of the first access point sleep interval; and
   initiating the sleep mode in the access point at the start of the first access point sleep interval.

2. The method of claim 1, wherein the first access point quiet information further comprises one or more of a time instant at which the access point enters the sleep mode, a time instant at which the access point wakes up from the sleep mode, and an indication of how often the access point enters the sleep mode.

3. The method of claim 1, further comprising:
   detecting, at the access point, a pending transmission associated with the first station, wherein the pending transmission comprises one of a data frame transmission and a management frame transmission;
   calculating a transmission time associated with the pending transmission;
   comparing the transmission time with an amount of time remaining before the first access point sleep interval begins;
   determining that the transmission time is greater than the amount of time remaining before the first access point sleep interval begins; and
   preventing execution of the pending transmission associated with the first station.

4. The method of claim 1, wherein the access point is a mobile phone access point.

5. The method of claim 1, wherein said calculating the first access point quiet information comprises calculating the first access point sleep interval that initiates the sleep mode in the access point during the first station sleep interval.

6. The method of claim 1, further comprising:
   determining that no stations are connected to the access point, via the wireless communication channel;
   calculating a second access point quiet information comprising a second access point sleep interval based, at least in part, on a beacon interval and on said determining that no stations are connected to the access point, wherein the beacon interval indicates a time interval in which a beacon is transmitted, and wherein the second access point sleep interval indicates a time interval in which the access point will enter a sleep mode;
   transmitting, via the wireless communication channel, a second beacon indicating the second access point quiet information to prevent one or more stations from initiating transmissions to the access point during the second access point sleep interval;
   determining, based on the second access point quiet information, a start of the second access point sleep interval;
   initiating the sleep mode in the access point at the start of the second access point sleep interval;
   determining, based on the second access point quiet information, an end of the second access point sleep interval; and
   initiating a normal operational mode, at the access point, in response to determining the end of the second access point sleep interval.

7. The method of claim 1, further comprising:
   receiving a second message at the access point from a second station, via the wireless communication channel, indicating a second station sleep interval associated with the second station, wherein the second station sleep interval indicates a time interval in which the second station will enter a sleep mode;
   calculating a second access point quiet information comprising a second access point sleep interval based, at least in part, on the first station sleep interval and the second station sleep interval, wherein the second access point sleep interval indicates a time interval for which the access point will enter a sleep mode; and
   transmitting to the first and the second stations, via the wireless communication channel, a second beacon indicating the second access point quiet information to prevent the first and the second stations from initiating transmissions to the access point during the second access point sleep interval.

8. The method of claim 7, wherein said calculating the second access point quiet information comprises:
   determining a least common factor between the first station sleep interval associated with the first station and the second station sleep interval associated with the second station; and
   determining when to initiate the second access point sleep interval based, at least in part, on said determining the least common factor between the first station sleep interval associated with the first station and the second station sleep interval associated with the second station.

9. A method comprising:
receiving access point quiet information at a station from an access point, via a wireless communication channel, wherein the access point quiet information comprises an access point sleep interval indicating a time interval for which the access point will enter a sleep mode;
determining that the wireless communication channel is available for transmission of information to the access point, wherein the transmission of information comprises one of a data frame transmission and a management frame transmission;
calculating a transmission time associated with the transmission of information to the access point;
comparing the transmission time with an amount of time remaining before a station sleep interval associated with the station begins, wherein the station sleep interval indicates a time interval in which the station will enter a sleep mode;
determining that the transmission time is less than the amount of time that remains before the station sleep interval begins; and
transmitting the information to the access point.

10. The method of claim 9, further comprising:
transmitting, to the access point, the station sleep interval associated with the station, wherein the access point sleep interval is determined based, in part, on the station sleep interval.

11. The method of claim 9, further comprising:
determining, based on the station sleep interval, a start of the station sleep interval; and
initiating the sleep mode in the station at the start of the station sleep interval.

12. The method of claim 11, wherein said determining, based on the station sleep interval, the start of the station sleep interval further comprises:
determining that a station sleep timer associated with the station is expired, wherein the station sleep timer indicates an amount of time that remains before the station enters the sleep mode.

13. The method of claim 12, further comprising:
storing, in a network allocation vector timer, associated with the station, the access point sleep interval, wherein the network allocation vector timer indicates an amount of time that remains before the station wakes up from the sleep mode;
determining that the network allocation vector timer associated with the station has expired; and
initiating a normal operational mode, at the station, in response to determining that the network allocation vector timer associated with the station has expired.

14. An access point device comprising:
a processor unit;
a transceiver unit coupled with the processor unit, the transceiver unit configured to receive a message from a first station, via a wireless communication channel, indicating a first station sleep interval associated with the first station, wherein the first station sleep interval indicates a time interval in which the first station will enter a sleep mode; and
a power saving unit coupled with the processor unit, the power saving unit configured to:
calculate a first access point quiet information comprising a first access point sleep interval based, at least in part, on the first station sleep interval, wherein the access point sleep interval indicates a time interval in which the access point device will enter a sleep mode;
transmit to the first station, via the wireless communication channel, a beacon indicating the first access point quiet information to prevent the first station from initiating transmissions to the access point device during the first access point sleep interval;
determine, based on the first access point quiet information, a start of the first access point sleep interval; and
initiate the sleep mode in the access point device at the start of the first access point sleep interval.

15. The access point device of claim 14, wherein the first access point quiet information further comprises one or more of a time instant at which the access point device enters the sleep mode, a time instant at which the access point device wakes up from the sleep mode, and an indication of how often the access point device enters the sleep mode.

16. The access point device of claim 14, further comprising:
the transceiver unit configured to:
detect a pending transmission associated with the first station, wherein the pending transmission comprises one of a data frame transmission and a management frame transmission;
the power saving unit configured to:
calculate a transmission time associated with the pending transmission;
compare the transmission time with an amount of time remaining before the first access point sleep interval begins;
determine that the transmission time is greater than the amount of time remaining before the first access point sleep interval begins; and
prevent execution of the pending transmission associated with the first station.

17. The access point device of claim 14, wherein the power saving unit configured to calculate the first access point quiet information further comprises the power saving unit configured to calculate the first access point sleep interval that initiates the sleep mode in the access point device during the first station sleep interval.

18. The access point device of claim 14, further comprising:
the power saving unit configured to
determine that no stations are connected to the access point device, via the wireless communication channel;
calculate a second access point quiet information comprising a second access point sleep interval based, at least in part, on a beacon interval and on said determining that no stations are connected to the access point device, wherein the beacon interval indicates a time interval in which a beacon is transmitted, and wherein the second access point sleep interval indicates a time interval in which the access point device will enter a sleep mode;
transmit, via the wireless communication channel, a second beacon indicating the second access point quiet information to prevent one or more stations from initiating transmissions to the access point device during the second access point sleep interval;
determine, based on the second access point quiet information, a start of the second access point sleep interval;
initiate the sleep mode in the access point device at the start of the second access point sleep interval;

determine, based on the second access point quiet information, an end of the second access point sleep interval; and initiate a normal operational mode, at the access point device, in response to determining the end of the second access point sleep interval.

19. The access point device of claim 14, further comprising:

the transceiver unit configured to:

receive a second message from a second station, via the wireless communication channel, indicating a second station sleep interval associated with the second station, wherein the second station sleep interval indicates a time interval in which the second station will enter a sleep mode;

the power saving unit configured to:

calculate a second access point quiet information comprising a second access point sleep interval based, at least in part, on the first station sleep interval and the second station sleep interval, wherein the second access point sleep interval indicates a time interval for which the access point device will enter a sleep mode; and transmit to the first and the second stations, via the wireless communication channel, a second beacon indicating the second access point quiet information to prevent the first and the second stations from initiating transmissions to the access point device during the second access point sleep interval.

20. The access point device of claim 19, wherein the power saving unit configured to calculate the second access point quiet information comprises the power saving unit configured to:

determine a least common factor between the first station sleep interval associated with the first station and the second station sleep interval associated with the second station; and determine when to initiate the second access point sleep interval based, at least in part, on said determining the least common factor between the first station sleep interval associated with the first station and the second station sleep interval associated with the second station.

21. One or more non-transitory machine-readable storage media, having instructions stored therein, which when executed by one or more processors causes the one or more processors to perform operations that comprise:

receiving a message at an access point from a first station, via a wireless communication channel, indicating a first station sleep interval associated with the first station, wherein the first station sleep interval indicates a time interval in which the first station will enter a sleep mode;

calculating a first access point quiet information comprising a first access point sleep interval based, at least in part, on the first station sleep interval, wherein the first access point sleep interval indicates a time interval in which the access point will enter a sleep mode;

transmitting to the first station, via the wireless communication channel, a beacon indicating the first access point quiet information to prevent the first station from initiating transmissions to the access point during the first access point sleep interval;

determining, based on the first access point quiet information, a start of the first access point sleep interval; and initiating the sleep mode in the access point at the start of the first access point sleep interval.

22. The machine-readable storage media of claim 21, wherein the first access point quiet information further comprises one or more of a time instant at which the access point enters the sleep mode, a time instant at which the access point wakes up from the sleep mode, and an indication of how often the access point enters the sleep mode.

23. The machine-readable storage media of claim 21, wherein the operations further comprise:

detecting, at the access point, a pending transmission associated with the first station, wherein the pending transmission comprises one of a data frame transmission and a management frame transmission;

calculating a transmission time associated with the pending transmission;

comparing the transmission time with an amount of time remaining before the first access point sleep interval begins;

determining that the transmission time is greater than the amount of time remaining before the first access point sleep interval begins; and preventing execution of the pending transmission associated with the first station.

24. The machine-readable storage media of claim 21, wherein the operations further comprise:

receiving a second message at the access point from a second station, via the wireless communication channel, indicating a second station sleep interval associated with the second station, wherein the second station sleep interval indicates a time interval for which the second station will enter a sleep mode;

calculating a second access point quiet information comprising a second access point sleep interval based, at least in part, on the first station sleep interval and the second station sleep interval, wherein the second access point sleep interval indicates a time interval for which the access point will enter a sleep mode; and transmitting to the first and the second stations, via the wireless communication channel, a second beacon indicating the second access point quiet information to prevent the first and the second stations from initiating transmissions to the access point during the second access point sleep interval.

25. The machine-readable storage media of claim 24, wherein said operation of calculating the second access point quiet information further comprises:

determining a least common factor between the first station sleep interval associated with the first station and the second station sleep interval associated with the second station; and determining when to initiate the second access point sleep interval based, at least in part, on said determining the least common factor between the first station sleep interval associated with the first station and the second station sleep interval associated with the second station.

* * * * *